UNITED STATES PATENT OFFICE.

WILLIAM C. PETERSEN, OF OMAHA, NEBRASKA, ASSIGNOR TO OMAHA BEET SYRUP AND CHICORY COMPANY, OF SAME PLACE.

PROCESS OF PRODUCING SYRUP FROM BEETS.

SPECIFICATION forming part of Letters Patent No. 669,659, dated March 12, 1901.

Application filed July 28, 1900. Serial No. 25,197. (No specimens.)

*To all whom it may concern:*

Be it known that I, WILLIAM C. PETERSEN, a citizen of the United States, residing at Omaha, in the county of Douglas and State of Nebraska, have invented a new and useful Process of Producing Syrup from Beets, of which the following is a specification.

The invention relates to a process of producing syrup from saccharine roots, and particularly from beets ordinarily termed "sugar-beets;" and the primary object in view is to produce a syrup of high quality which will not crystallize and form sugar and will not ferment.

In carrying out my improved process the beets in their original condition or, in other words, without previous rasping or abrading are subjected to a boiling heat in water at atmospheric pressure, any suitable kettle, receptacle, or vessel being employed for that purpose, and as nearly as possible the boiling temperature—approximately 212° Fahrenheit—is maintained for a period of two hours or more, according to the quality of the beets, with the result that the salts in the beet are drawn to the surface and accumulate between the body or meat of the beet and the skin. The beets are then removed and carefully skinned to avoid injury to the pulp, after which they are again subjected for another period of two hours to a boiling temperature in water to remove any adhering traces of the salts and to thoroughly soften the beets. The cooked and skinned beets are then pressed by any suitable means, and the expressed juice, which is rich in saccharine matter, may be subjected to defecation. For instance, a small quantity of charcoal, preferably bone-charcoal, may be placed with the syrup in a suitable kettle and subjected to heat for a period of, say, ten minutes, after which the charcoal may be removed by filtration. Finally the juice should be boiled down to the desired consistency. It will be understood that the boiling down of the juice is merely to give the same the thickened or "syrup" consistency common to maple-syrup and the like.

After having subjected the beets to the process which I have described as my invention the main product or syrup is non-crystallizable and may be kept for any length of time without the formation or precipitation of sugar-crystals. Moreover, the syrup does not deteriorate with age and fermentation does not ensue. The syrup made by my process is of a light-yellow or golden color, and when clarified by subjection to the action of charcoal and subsequent filtration the color is still further brightened, so as to closely resemble maple-syrup.

Having described my invention, what I claim is—

1. The herein-described process of obtaining saccharine juices from beets, consisting in boiling the beets in water, skinning the boiled beets, reboiling the beets after they are skinned, and expressing the juices therefrom.

2. The herein-described process of making non-crystallizable beet-syrup, consisting in boiling beets in water, skinning the boiled beets, reboiling the beets after they are skinned, extracting the saccharine juices therefrom, defecating said juices and boiling down the same to the desired consistency.

In testimony that I claim the foregoing as my own I have hereto affixed my signature in the presence of two witnesses.

WILLIAM C. PETERSEN.

Witnesses:
E. E. DOYLE,
HARRY H. HOLLANDER.